Jan. 21, 1930.  J. H. PEW  1,744,574
PROCESS OF CRACKING MINERAL OIL
Filed Feb. 10, 1926

INVENTOR
John Howard Pew
BY
Busser and Harding
ATTORNEYS.

WITNESS:

Patented Jan. 21, 1930

1,744,574

UNITED STATES PATENT OFFICE

JOHN HOWARD PEW, OF ARDMORE, PENNSYLVANIA, ASSIGNOR TO SUN OIL COMPANY, OF PHILADELPHIA, PENNSYLVANIA, A CORPORATION OF NEW JERSEY

PROCESS OF CRACKING MINERAL OIL

Application filed February 10, 1926. Serial No. 87,244.

In the art of treating high boiling and high gravity hydrocarbon oils for the purpose of decomposing them to convert them into lower boiling and lower gravity hydrocarbon oils, which art is generally known as "cracking," the most common procedure is to subject the oil to be cracked to high temperature and a substantial pressure above atmospheric. The art is a very old one. In recent years, its most useful industrial application is in the production of gasoline from such higher boiling and higher gravity petroleum oils as gas oil and fuel oils. The cracking operation may be conducted in batch or it may be carried on in a continuous manner. The cracking may be effected in vapor phase or in liquid phase or partly in one phase and partly in another. With a sufficiently high temperature (the minimum of which is about 600° F.), and under a pressure of several atmospheres, a considerable percentage of, for example, gas oil, may be decomposed or cracked into gasoline. At 800° and higher temperatures, under the moderate pressures specified, the conversion will take place largely in vapor phase, or in both phases. If the pressure be greatly increased, a larger proportion of the oil will be cracked in liquid phase. At a pressure of (say) 600 pounds to the square inch or (say) 40 atmospheres, the oil will be cracked almost wholly in liquid phase.

In continuous processes for cracking higher boiling petroleum constituents to gasoline, it is old and well known to convey the oil to be decomposed, which may be initially preheated, through a long tube or tubes in immediate contact with heating gases and therein to raise the oil to a cracking temperature and either complete the cracking therein or perform a part of the cracking therein. In such processes the formation and accumulation in the tubes of carbon and resinous matters tends to insulate the oil from the heating media and clog the tubes, necessitating their frequent cleaning.

The object of my invention is to so conduct the process as to avoid the formation and deposition, in the tube or other reaction chamber or passage, during the cracking operation, of coke (carbon) and instead to effect the formation of solids, other than carbon, which are soluble in certain fluids, and in removing such solids by passing through the reaction tubes or into the reaction chamber such a solvent.

Before describing the process it may be informative to set forth more in detail the cause, nature and effects of coke formation. Certain factors in the problem are well understood, while other factors seem not to be generally appreciated and may not have been heretofore known.

With the usual method of heating the oil to raise it to a cracking temperature, whether it is flowing in a long tube or comparatively quiescent in a tank, the temperature difference between the furnace gases and the oil is and must be very great. Consequently the film of oil immediately in contact with the metal of the tube is raised to a temperature much above that of the average temperature of the whole body of oil. This causes the highly heated part of the oil to be raised not only to a decomposition or cracking temperature but to a temperature high enough to separate out certain constituents and convert them into coke, which is deposited on the tube wall. Substantial deposition of coke does not occur until after the process has been in operation for some little time. Once, however, the coke starts to form, it forms very rapidly. The coke acts as an insulator, requiring more heat to penetrate it in order to heat the entire body of oil to a cracking temperature. This raises the temperature of the tubes. The coke that has already formed acts to absorb oil, which, at the increased temperature of the tubes, causes it to form coke rapidly. In short, once the formation of the coke starts, its rate of production is constantly accelerated.

Careful experimental work in connection with the practical development of the present invention, wherein the oil was heated to a cracking temperature under conditions which prevented local heating much above the upper limit of the desirable cracking temperature, resulted in the formation of little or no coke. That is, coke occurs within temperature ranges that are materially above the upper limit of the desirable cracking temperature range. In the ordinary cracking processes, the oil flowing through the tubes is necessarily subjected to an excessively high temperature because the heat transfer from gases of combustion to the oil is very low and, in a commercial unit, it is essential that the difference in temperature between the heating gases and the oil be very great; otherwise, the large amount of heating surface necessary would involve too high a cost. Further, the insulating effect of the accumulating layer of carbon in the tubes necessitates a still greater temperature difference between the furnace gases and the tubes and the subjection of the peripheral zone of the stream of oil to still higher temperatures in order that the main body of the traveling oil shall be subjected to the lower cracking temperature desired.

However, while, in said experimental and development work, the oil was cracked without substantial formation of coke, asphaltene was formed in substantial amounts. Asphaltene is often mistaken for coke and, like coke, it has insulating qualities and, its formation, when started, proceeds at an accelerating rate. Asphaltene, however, unlike coke, is soluble in different liquids, such as carbon bisulphide, or in petrolene, which latter substance itself may be separated out by dissolving the asphaltene in gasoline, precipitating the asphaltene and evaporating the gasoline from the petrolene. Coke that is formed at higher temperatures cannot be dissolved and must be removed from the tubes by mechanical means.

It is clear that if the temperature difference between the heating medium and the oil could be sufficiently reduced, the condition promotive of the formation of coke would be eliminated, and if no solids were formed and deposited other than soluble solids, an extremely convenient, expeditious and economical removal of such solids could be effected by discontinuing the process at intervals and running a solvent of the solids through the tube.

It has been found practicable to secure the desired low temperature difference between the heating medium and the oil by means of the indirect application of the primary heating agent and the direct transmissions of heat to the oil by means of a secondary heating agent which, under practicable absolute pressures, will boil at a temperature to which it is desirable to raise the oil, and which, in the vapor form, is flowed into heat exchange relation with the oil and is condensed thereby and gives up its latent heat to the oil, the condensate returning to a liquid body of the substance, which is continuously being heated by the primary heating agent and is continuously generating vapor. In the application of Pew and Thomas, No. 13,040, filed March 5, 1925, which is a continuation in part of an application filed March 17, 1924, No. 699,615, the advantage of using a vaporized metal, such as mercury, as a direct heating agent for mineral oil, is clearly and fully disclosed. Mercury has a high boiling point and high heat conductivity; it will not oxidize or disintegrate when heated or brought into contact with iron; and it may be condensed and its latent heat transferred to the oil by heat exchange at temperatures within the desirable range of oil cracking temperatures. The most important and valuable quality of mercury vapor, in its application to the cracking of oil, is that, to accomplish the same degree and rapidity of cracking, the difference between the temperature of the mercury vapor and that to which it is necessary to raise the oil need be very small relatively to the necessary temperature difference between the oil and ordinary furnace gases or other ordinary heating media. In other words, the temperature of the heating medium from which heat is directly transferred through the tube wall to the oil may be so relatively low that all the objectionable coke forming conditions hereinbefore recited are minimized or avoided. No insoluble coky residue is formed because of the absence of the elevated temperature required to form it, and the conditions promotive of the building up of an insulating wall of coke are absent. However, even at the much lower temperature of the heating medium, a solid residue will begin to form after the process has been in operation for some time, and this residue tends to form at a somewhat accelerative rate and to act, similarly to coke, as an insulator. It is believed that this solid residue is wholly or largely asphaltene; and in specifying asphaltene in the claims I mean to define that solid residue which is soluble in different inexpensive liquids, such as petrolene or carbon bisulfid, as distinguished from that solid coky residue which, so far as I know, is insoluble in any liquid. At any time after it starts to form, the oil cracking process may be suspended for a few minutes, and the solid residue may be readily removed by flowing a stream of solvent liquid through the tubes, leaving their inner walls clean.

It is clear that such a procedure is very much simpler, cheaper and efficacious than is the cleaning of the tubes by mechanical means. It becomes feasible to arrest the cracking process and dissolve out the solids whenever they begin to form, so that at no time is any material amount of heat wasted in penetrating a heat insulating envelope surrounding the flowing body of oil.

In heating oil by means of furnace gases applied direct to a stream of oil flowing through a tube, a great temperature difference between the furnace gases and the oil is not objectionable while the oil is being heated up to a cracking temperature. Below about 800° F., heat can be applied to the oil at a comparatively high rate per square foot of heating surface without injurious local cracking. It is therefore found practicable to utilize the waste heat of the primary heating medium by subjecting the relatively cold oil to the heat of the furnace gases after they pass beyond the mercury boiler, thereby quickly preheating the oil to a high temperature, which, however, preferably does not reach, and ought not to exceed, the temperature at which substantial cracking begins.

It is desirable, particularly after the oil has been raised to a cracking temperature, to raise the temperature gradually through the cracking zone. While the higher the temperature, the more rapid the cracking, and while it is permissible to impart a higher temperature to the oil with mercury vapor as a heating medium than with the usual furnace gases, due to the small temperature difference necessary between the oil and the heating medium, it is objectionable, for reasons hereinbefore fully stated, to crack at an unnecessarily high temperature. While it is usually not necessary to exceed a temperature of about 875° at the exit end of the oil stream, by my method this temperature can readily be raised in cases where the oils being handled demand this increased temperature. A mercury vapor temperature 25° to 50° above that of the maximum temperature of the oil, is capable of raising the preheated part of the oil stream to the specified maximum temperature and it is practical to subject the entire stream of oil to the temperature of the mercury vapor immediately after the oil leaves the preheater. It is advantageous, however, to maintain a small temperature difference between the oil entering the stream and the mercury vapor, so as to avoid a sudden rise of temperature of the peripheral part of the stream, or the film adjacent the inner wall of the tube. To maintain this small temperature difference and to insure a gradual heating up through the cracking range of the entire body of the oil and to provide a minimum practicable temperature difference between the mercury and the oil at all points in the latter's flow, it is arranged to heat the oil in stages, the temperature of the mercury being raised in the successive stages.

While the process is not dependent for its execution on any particular construction and arrangement of apparatus, the drawings represent the lay-out of a plant in which the process is adapted to be carried out in a particularly practicable and advantageous way.

Figure 2:
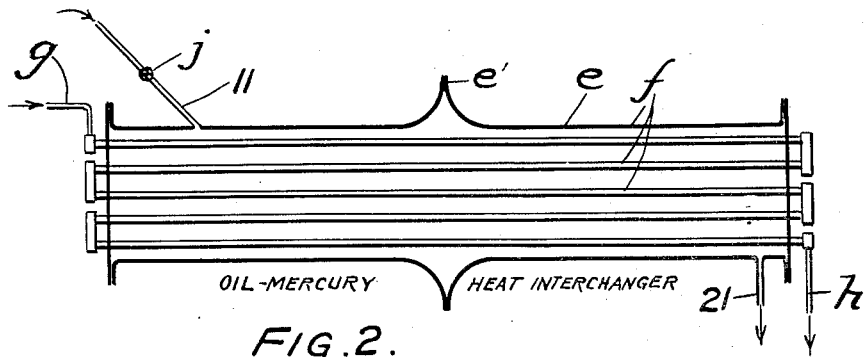
Fig. 2 is a detail view of one of the heat-exchange or cracking units.
Figure 1:
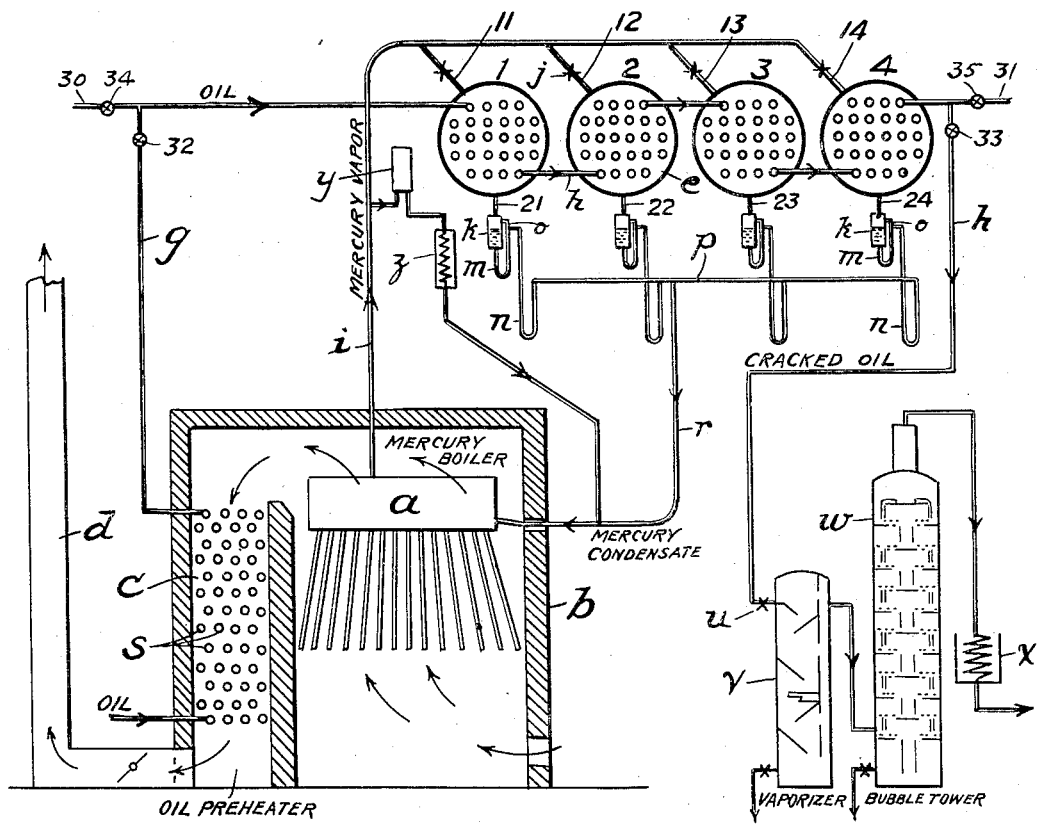
Fig. 1 is an elevation, largely diagrammatic, of a complete cracking plant.

The mercury boiler $a$ is contained in a furnace $b$ which is provided with a down-take $c$. The furnace gases pass upward around the boiler, thence laterally and thence downward through the down-take $c$ and thence upward through a stack $d$.

Above the boiler is arranged a series of cracking units, each comprising a shell $e$, functioning as an oil heating and mercury vapor-condensing chamber, and a nest of tubes $f$. The tubes are so arranged that the oil entering from pipe $g$ must flow back and forth repeatedly before leaving at $h$. It is desirable that the oil should be given sufficient velocity to aid in cleaning the tube walls and the length of travel must be sufficient to allow proper time for the reaction to take place.

From the mercury boiler $a$ a mercury vapor line $i$ extends upward and thence laterally along the cracking units, 1, 2, 3 and 4 and is provided with four feeds 11, 12, 13 and 14 extending to the respective chambers $e$ of the four cracking units 1, 2, 3 and 4. Each feed is provided with a valve $j$.

From the several chambers $e$ extend mercury condensate return lines 21, 22, 23 and 24 to a header $p$. Each return line comprises a trap consisting of a cup $k$ and a goose-neck $m$, and another goose-neck $n$. The upper part of goose-neck $m$ connects with the upper part of the cup by a vapor pipe $o$. The part $n$ connects with a header $p$, which is connected with the mercury boiler by means of a pipe $r$.

In the down-take $c$ is a nest of tubes $s$ comprising a preheater. Relatively cold oil is pumped into one of the bottom tubes and thence flows back and forth repeatedly and finally leaves one of the top tubes and flows through pipe $g$ to cracking unit 1. The oil leaving the tubes $f$ of unit 1 through pipe $h$ enters unit 2, and thence flows through units 2, 3 and 4 in series.

The mercury vaporized in boiler $a$ passes through line $i$ and thence, through the independent feeds 11, 12, 13 and 14, to the several mercury chambers $e$ of the four units 1, 2, 3 and 4.

In each chamber $e$ the mercury vapor is condensed and its latent heat is transferred to the oil. Mercury condensate returns from the chambers $e$ through the return lines 21, 22, 23 and 24 to the header $p$ and thence, through pipe $r$ to the boiler $a$.

From the last cracking unit 4, the oil passes through a pipe $h$ into a varporizer $v$. The exit to the vaporizer may be controlled by a valve $u$. Beyond the vaporizer is a bubble tower $w$ and beyond that a condenser $x$.

A more specific description of the operation follows: It should be understood that the more detailed information, such as pressures and temperatures, are illustrative only.

The figures given are to be taken in a relative, rather than in an absolute, sense. Various pressures, temperatures and temperature differences may be desired by the operator, and these may be predetermined with a rather close approach to exactitude.

It should be particularly borne in mind that the specific plant above described is adapted particularly to cracking mainly in a liquid phase, as the pressure in the oil system given below indicates.

Oil is pumped through the preheater $s$ and thence in series through the tubes $f$ of the cracking units and is maintained, throughout, at a high pressure, say 600 pounds per square inch.

The mercury boiler may be operated at a pressure of about 80–85 pounds gauge pressure, which will give a mercury vapor temperature of about 900° F. The mercury vapor flows through the several cracking units in parallel.

The temperatures of the mercury chambers $e$ of the successive units should progressively increase. Valve $j$ in line 14 controlling the inflow of mercury vapor to unit 4 is left wide open, which will maintain a temperature in chamber $e$ of that unit of 900° F. A lower temperature may be established in any chamber by more or less throttling the admission valve. Thus valve $j$ in line 13 is closed to the degree that will give a temperature in the chamber $c$ of unit 3 of 850° F. Chamber $e$ of unit 2 may be held at a temperature of 800° F. by still further throttling valve 12. By still more nearly closing valve 11, chamber $e$ of unit 1 may be held at a temperature of 750° F.

The oil entering the preheater $s$ may have a temperature of 200° F., and during its flow therethrough is heated to any desired higher temperature, say 600° F. It is desirable that the oil should be heated in the preheated to a temperature below that at which substantial cracking occurs. Indeed it is preferred that there shall be no cracking at all in the preheater. The oil then enters the tubes $f$ of unit 1 at a temperature of 600° F. By heat exchange with the mercury vapor in the surrounding chamber $e$, (which as above stated, is at a temperature of about 750° F.) the vapor is condensed and its latent heat is transferred to the oil, which leaves unit 1 at a temperature of 670° F. There is thus an average temperature difference between the heating medium and the heated medium of about 115° F.

The oil enters unit 2 at temperature of 670°F. and is heated therein to a temperature of 740° F. There is thus an average temperature difference in this unit between the mercury and the oil of 95° F.

The oil enters unit 3 at a temperature of 740° F. and leaves at a temperature of 810° F., the average temperature difference in this unit between the mercury and oil being 75° F.

The oil enters unit 4 at a temperature of 810° F. and leaves at a temperature of 875° F. The temperature difference between the mercury and oil in this unit is 57° F.

The oil leaving pipe $h$ at valve $u$ enters the vaporizer $v$. Here the pressure on the oil is instantly released and nearly all of it immediately vaporizes. A small proportion (say five or ten per cent) is thrown down in the vaporizer. The vapors enter the bubble tower $w$ wherein they are fractionated by passing up through descending condensed oil. The uncondensed gasoline vapors leave the bubble tower and are subsequently condensed in condenser $x$. The gasoline vapors may be purified on the way to the condenser or the final condensate may be purified.

The relatively low absolute temperature of the heating medium is an essential feature of the process, although the temperature may be carried somewhat above 900° F., if desired; that is, it may be carried to a temperature just short of that at which any substantial amount of coke begins to form. This temperature, however, is necessarily less than that to which it is practically necessary that furnace gases should be heated in order to crack, with sufficient rapidity, the desired proportion of the oil. The very small temperature differences between the heating medium and the oil, due to the cracking in stages as hereinbefore described, are also of importance, although they may not be essential; the more vital factor being the limitation placed on the maximum temperature of the mercury.

The mercury that is condensed in the chambers $e$ of the several cracking units is returned by gravity to the boiler. In order to effect this gravity flow, the units should be located at such a height above the boiler that the column of mercury in the return line may have a head equal to the pressure carried in the boiler.

Any foreign matter in the mercury collects in the traps $km$, and is thus prevented from being carried back into the boiler. From time to time the traps may be opened and foreign matter removed from the surfaces of the mercury in the cups $k$.

A by-pass for excess mercury vapor is provided between the mercury vapor line $i$ and the liquid mercury return line $r$. In this by-pass is located a safety valve or maximum pressure relief valve $y$ and a condenser $z$.

A longitudinal section of one of the cracking units is shown in Figure 2. The shell $e$ must be made of sufficient strength to carry the required pressure of mercury vapor. The tubes $f$ must be made of a size and strength suitable for carrying oil at the high pressure specified. For the liquid phase system, the tubes should have walls about half an inch thick. The tubes may be welded to the heads of the shell e. By reason of the temperature difference between the tubes and the shell, provision should be made for expansion and contraction. One way of providing for expansion and contraction is to make the shell in two sections with an expansion joint e' at the center. These details, however, may be worked out by engineers skilled in the art of heat exchanging.

Connected with the oil pipe g is a solvent admission pipe 30. Connected with the pipe h is a solvent exit pipe 31. Pipe g is provided with a valve 32, pipe h with a valve 33, pipe 30 with a valve 34, and pipe 31 with a valve 35. After the solids begin to form and deposit in the tubes, the flow of oil through pipe g, the cracking units and pipe h is arrested, and after all the oil in the tubes of the cracking unit has passed beyond valve 33, valves 32 and 33 are closed, and valves 34 and 35 are opened, and a stream of carbon bisulfid, petrolene, or other solvent of asphaltene, is passed through the tubes. In the course of its flow, the solvent dissolves the solid deposit and the solution passes out of the system through pipe 31. That the escaping liquid is a solution of the preexisting solids and the solvent is demonstrated by the fact that the solvent, before admission to the tubes, is free of suspended solids, by the fact that after the solvent is passed through the tubes they are seen to have been cleaned of the solids observed to have been present after the system was drained of oil, and by the fact that the escaping liquid, if it contains any suspended solids at all, contains an amount thereof very much less than the amount of the solids that had accumulated on the tube wall; demonstrating that the cleaning liquid has a true dissolving action as distinguished from a flushing action. Valves 34 and 35 are now closed and valves 32 and 33 opened, and the flow of oil through the cracking units is resumed. This method of cleaning out the tubes, wholly unworkable to clean out coke deposits, is obviously strikingly simple, rapid and inexpensive.

The process is adapted to the cracking of oil in vapor phase, or, more conveniently, in mixed phase (liquid and vapor phase). Such a two phase process is disclosed in an application filed February 24, 1926, Serial No. 90,247 by Pew and Thomas.

In addition to the advantages hereinbefore specified, the following advantages may be enumerated.

No part of the oil is heated much above the maximum cracking temperature desired.

Little or no heat is wasted in penetrating an insulating wall, as it is practicable to clean out the tubes as soon as solids begin to form and deposit therein.

Inasmuch as the tubes are never subjected to very high heat, they never burn and there is no depreciation in equipment.

The process can be economically operated continuously for a longer time, without cleaning out the flues, than is practicable in a process involving the transmission of the heat direct from furnace gases.

While mercury is prepared as the direct heating agent, it is possible to substitute other vaporizable metals, such as cadmium and zinc; their temperatures of condensation being controllable by governing the absolute pressures under which they are vaporized.

What I claim is:

1. The process of cracking mineral oil which comprises heating oil in a container to a temperature high enough to effect substantial cracking with formation of asphaltene and its deposition and accumulation on the container wall but not high enough to cause the building up on the container wall of a substantial amount of insoluble coky material, removing the oil from the container, admitting to the container a solvent of asphaltene and thereby dissolving the same and removing the solvent and dissolved matter.

2. The process of cracking mineral oil which comprises flowing the oil through a tube at such a rate, and so heating it while flowing, that the oil will be raised to a cracking temperature with formation of asphaltene and its deposition and accumulation on the tube wall but without building up, on the tube wall, a substantial amount of an insoluble coky residue, and after the stream of oil has left the tube, flowing therethrough a solvent of asphaltene and thereby dissolving the same and removing the solution from the tube.

3. The process of cracking mineral oil which comprises heating oil in a container to a cracking temperature by means of a vaporized metallic heating medium adapted to transfer its heat to the oil through the container wall while at a temperature not greatly exceeding that of the oil and which is at a temperature high enough to effect substantial cracking of the oil with formation of asphaltene and its deposition and accumulation on the container wall but not high enough to cause the building up, on the container wall, of a substantial amount of insoluble coky residue, removing the oil from the container, admitting to the container a solvent of asphaltene and thereby dissolving the same and removing the solvent and dissolved matter.

4. The process of cracking mineral oil which comprises flowing a stream of oil continuously through a tube and heating it while so flowing to a cracking temperature by means of a vaporized metallic heating medium which is held at a temperature below that required to cause the building up, on the tube wall, of a substantial amount of an insoluble coky residue, but high enough to cause the formation of asphaltene and its deposition and accumulation on the container wall, removing the oil from the container, admitting to the container a solvent of asphaltene and thereby dissolving the same and removing the solvent and dissolved matter.

5. The process of cracking mineral oil which comprises flowing a stream of oil successively through a series of cracking zones, flowing a vaporized metallic heating medium into heat exchange relation with the oil in each zone, maintaining the metallic vapor in each zone at a temperature high enough to effect substantial cracking of the oil with formation and accumulation of asphaltene within the cracking zones but below that required to form any substantial amount of insoluble coky residue, maintaining the metallic vapor at progressively higher temperatures in the successive heating zones and effecting in each zone condensation of metallic vapor and such transfer of its latent heat to the oil as will decompose higher boiling constituents into lower boiling products, stopping the flow of oil through, and removing it from, the cracking zones, and flowing a solvent of asphaltene through and out of the part of the cracking zones from which the oil was removed and thereby dissolving the asphaltene and removing the solution.

In testimony of which invention, I have hereunto set my hand, at Philadephia, Pennsylvania, on this 6th day of February, 1926.

JOHN HOWARD PEW.